US009291261B2

(12) United States Patent
Münch et al.

(10) Patent No.: US 9,291,261 B2
(45) Date of Patent: Mar. 22, 2016

(54) METHOD FOR DETERMINING THE SHIFT SEQUENCE OF A CHANGE OF TRANSMISSION RATIO OF A TRANSMISSION DEVICE IN A VEHICLE DRIVE TRAIN

(75) Inventors: Eckehard Münch, Friedrichshafen (DE); Uwe Heitz, Markdorf (DE); Mauro Zanella, Friedrichshafen (DE); Manfred Sieger, Freudenstadt (DE); Jörg Geis, Markdorf (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 198 days.

(21) Appl. No.: 14/117,740

(22) PCT Filed: Mar. 13, 2012

(86) PCT No.: PCT/EP2012/054336
§ 371 (c)(1),
(2), (4) Date: Nov. 14, 2013

(87) PCT Pub. No.: WO2012/156112
PCT Pub. Date: Nov. 22, 2012

(65) Prior Publication Data
US 2014/0088844 A1    Mar. 27, 2014

(30) Foreign Application Priority Data
May 16, 2011   (DE) .......................... 10 2011 075 913

(51) Int. Cl.
*F16H 61/68*   (2006.01)
*F16H 61/06*   (2006.01)
(Continued)

(52) U.S. Cl.
CPC ................ *F16H 61/68* (2013.01); *F16H 61/06* (2013.01); *F16H 61/702* (2013.01); *F16H 2061/0093* (2013.01); *F16H 2061/161* (2013.01)

(58) Field of Classification Search
None
See application file for complete search history.

(56) References Cited

U.S. PATENT DOCUMENTS 5,425,689 A   6/1995   Genise
5,620,392 A   4/1997   Genise
(Continued)

FOREIGN PATENT DOCUMENTS

DE   10 2005 044 828 A1   3/2007

OTHER PUBLICATIONS

Article—Gruppenschaltungsansteuerung von Nutzfahrzeuggetrieben, Institut für Maschinenkonstruktion und Getriebebau Universität Stuggart, 2004.
(Continued)

*Primary Examiner* — John R Olszewski
*Assistant Examiner* — James M McPherson
(74) *Attorney, Agent, or Firm* — Dority & Manning, P.A.

(57) ABSTRACT

The shift sequence for a transmission ratio change of a vehicle drive train is determined depending on an operating state of the vehicle drive train existing upon the actual transmission ratio of the transmission device. The operating state is characterized by various operating state quantities of the vehicle drive train, which represent input quantities of a model representing the vehicle drive train. Output quantities of the model supply at least one target value that determines the shift sequence in terms of characterization and application as input quantities of an optimization routine, by which a minimization of the functional connection of at least one target value is carried out. The torque characteristics representing the shift sequence of devices of the vehicle drive train are determined depending on the minimum of the functional connection of at least one target value, taking into account the limits of the operating state quantities.

15 Claims, 2 Drawing Sheets

(51) Int. Cl.
*F16H 61/70* (2006.01)
*F16H 61/16* (2006.01)
*F16H 61/00* (2006.01)

(56) References Cited

U.S. PATENT DOCUMENTS

| | | |
|---|---|---|
| 5,904,068 A | 5/1999 | Genise |
| 6,154,701 A | 11/2000 | Löffler et al. |
| 6,591,705 B1 * | 7/2003 | Reik et al. ........................ 74/343 |
| 6,594,573 B1 | 7/2003 | Rossmann et al. |
| 2011/0010061 A1 * | 1/2011 | Seufert ........................... 701/55 |

OTHER PUBLICATIONS

German Patent Office Search Report, Mar. 29, 2012.
PCT International Search Report, Jun. 1, 2012.
PCT International Examination Report, Jun. 1, 2012.

* cited by examiner

Fig. 1

METHOD FOR DETERMINING THE SHIFT SEQUENCE OF A CHANGE OF TRANSMISSION RATIO OF A TRANSMISSION DEVICE IN A VEHICLE DRIVE TRAIN

FIELD OF THE INVENTION

The invention relates to a method for determining the shift sequence of a change of transmission ratio of a transmission device, wherein for carrying out the change of transmission ratio, at least one shifting element arising from a power flow of the vehicle drive train is to be switched off and at least one additional shifting element in the power flow is to be switched on.

BACKGROUND

In general, a transmission of a vehicle drive train, such as a vehicle drive train of a commercial vehicle or a mobile drive unit, is intended to mechanically convert power from the crankshaft of the engine in a different speed and torque level, and to transmit this to the drive wheels of an output drive. Transmission devices of commercial vehicles often consist of two serially arranged transmissions. One of the gears, which is also referred to as a splitter, thereby carries out small transmission jumps, while the other gear, which is referred to as a group or as a main gearbox, is intended to present large transmission jumps. Such combinations allow the transmission to carry a high number of transmission stages.

The gear constructed as both a splitter and as a group can be an automatic powershift transmission. During changes of transmission ratios in two serially arranged transmission devices comprising a transmission, in principle, two different types of power shifts arise, so-called "simple power shifts" and so-called "group change power shifts". During simple power shifts, for carrying out a requested change of transmission ratio solely by the splitter, one transmission ratio is changed, while for group change power shifts, a change to the transmission ratio to carry out the requested change of transmission ratio occurs with both the groups and of the splitter transmission.

During a group change power shift, the two power shifts by the splitter transmission and by the group transmission run simultaneously, and must be coordinated accordingly, whereas, during the change of transmission ratio from the output transmission ratio to the target transmission ratio within the transmission device, a larger transmission jump must be overcome within the transmission device. This results in a large change in the rotation speed of a shaft connecting the group transmission and the splitter transmission with one another, which is also referred to as the central shaft. Under certain circumstances, the large change in rotation speed of the central shaft that occurs during the group change power shift leads to a significant influence of a rotation speed at the output drive and, as a result, to an increased component load, and may also impair drive comfort to an undesirable extent. These disadvantages occur particularly in very high transmission jumps, or even a large amount of inertia in the central shaft.

With the method known from conventional practice, a requested change of transmission ratio in transmission devices is used depending on fixed pressure characteristics and/or characteristics of torques, which are in turn selected depending on the particular operating situation of a vehicle drive train, among other things depending on the current type of shifting, a current drive torque of a drive unit and the like, and depending on which the shifting elements involved in the change of transmission ratio, such as clutches or brakes, are correspondingly activated. The pressure characteristics and the characteristics of each torque to be adjusted at the shifting elements are varied until, starting from a current operating state of a vehicle drive train and thus a transmission device, a desired rotation speed characteristic is adjusted in the transmission device. The application of these processes is effected depending on a multiple of operating parameters, and is therefore very elaborate.

One approach that simplifies the application is the use of a mechanical transmission model for determining the pressure characteristics and/or each torque to be adjusted at the shifting elements. In determining the pressure or torque characteristics, two basic approaches must be distinguished. With one approach, the pressure or torque characteristics are calculated directly through the mechanical transmission model for the shifting elements involved in carrying out a change of transmission ratio, whereas simplifications in the model must be undertaken for this. In the course of development, it has turned out that the simplifications are not acceptable in some cases. For such cases, special functions with their own application parameters are provided, but these are characterized by a high degree of complexity, and lead to higher application effort.

With another approach, determining the pressure and torque characteristics takes place offline with the assistance of optimization approaches. Such an optimization is known from the 2004 dissertation attributed to Wolfgang Klos with the title "Group Shifting Control of Commercial Vehicle Transmissions," of the University of Stuttgart, reports of the Institute for Engine Construction and Transmission Construction, Prof. H. Binz, report no. 508.

Characteristics of control pressures, on the basis of which the shifting elements involved in carrying out a requested shifting and/or a requested change of transmission ratio of a transmission device, are prescribed as ramp functions, whereas each of the slopes of the ramps form the optimization parameters. An optimization takes place only for the shifting elements and/or clutches to be switched on or closed in the power flow of a vehicle drive train, while the course of a shifting element to be opened during the change of transmission ratio is not affected in the optimization problem. Furthermore, the target quantities underlying the optimization are defined through the quadratic sum of the deviations of the simulated torque and rotation speed characteristics of desired optimal characteristics, whereas a relatively complex model of the vehicle drive train is used. The optimization of the complex model requires an elaborate global optimization method. A so-called "grid search" is used as an optimization method, which can only be used for a few optimization parameters. With this approach, an online optimization by control unit is not feasible, since, on the one hand based on the elaborate optimization method, and on the other hand through the underlying complex model built component-by-component, the optimization is not feasible within the operating times required for this.

SUMMARY OF THE INVENTION

As such, the present invention is subject to the task of providing a method by means of which a shift sequence of a change of transmission ratio of a transmission device of a vehicle drive train is able to be determined with little effort and taking into account a small number of operating parameters. Additional objects and advantages of the invention will be set forth in part in the following description, or may be obvious from the description, or may be learned through practice of the invention.

A method under the invention is provided for determining a shift sequence of a change of transmission ratio of a transmission device of a vehicle drive train with a drive unit connected to the transmission device on the side of the input of the transmission and an output drive operatively connected to the transmission device on the side of the output of the transmission. Starting from an actual transmission ratio inserted in the transmission device in the direction of a target transmission ratio to be inserted in the transmission device for carrying out the change of transmission ratio, at least one shifting element arising from a power flow of the vehicle drive train is to be switched off, and at least one additional shifting element in the power flow is to be switched on.

In accordance with the invention, the shift sequence is determined depending on the operating state of the vehicle drive train existing upon the actual transmission ratio inserted in the transmission device. The operating state is characterized by various operating state quantities of the vehicle drive train, which represent input quantities of a model representing the vehicle drive train. Output quantities of the model supply at least one target value that determines the shift sequence in terms of characterization and application, in the form of a functional connection and limits of the operating state quantities or of combinations of operating state quantities as input quantities of an optimization routine, by of which a minimization of the functional connection of at least one target value is carried out. The torque characteristics representing the shift sequence of devices of the vehicle drive train are determined depending on the minimum of the functional connection of at least one target value, taking into account the limits of the operating state quantities, by which, during each change of transmission ratio, a torque is introduced in the vehicle drive train and/or a torque leading into the vehicle drive train is changed.

The method under the invention uses a model representing the vehicle drive train, in order to determine, through the torque characteristics of the devices of the vehicle drive train determined through the optimization routine, by which, during each change of transmission ratio, a torque is introduced in the vehicle drive train and/or a torque leading into the vehicle drive train is changed, resulting optimum rotation speeds and angular accelerations of the shafts of the vehicle drive train for the shifting to be carried out and/or for the change of transmission ratio to be carried out in the transmission device. Through the fact that at least one target value is supplied in the form of a functional connection and limits of operating state quantities as input quantities instead of torque characteristics characterizing the shift sequence as input quantities of the optimization routine, the problem of design is inverted. The target value, of which there is at least one, and the limits of the operating state quantities are largely independent of various driving situations, by which the design is highly simplified and accelerated, as the optimization is feasible based on a small number of different application parameters.

With an advantageous variant of the method under the invention, the minimization of at least one target value is carried out iteratively, and the characteristics of the torques are determined iteratively through the optimization routine. In this way, the shift sequence of a change of transmission ratio in a transmission device is, compared to the method known from the state of the art, able to be determined both with lower computing power and within shorter computing times.

A shift sequence of a change of transmission ratio of a transmission device is also able to be determined online, if the optimization routine comprises a locally convergent optimization method, preferably a derivative optimization method, by means of which the optimization is feasible within short operating times.

With additional advantageous variants of the method under the invention, the optimization routine comprises a rapid, locally convergent method for solving limited optimization problems, preferably a simplex method or an interior points method for solving linear optimization problems, a method of quadratic optimization for solving quadratic optimization problems, or preferably a so-called "SQP method" (sequential quadratic programming) or an interior points method for solving limited non-linear optimization problems, in order to be able determine the shift sequence of a change of transmission ratio in a transmission device within a few computing steps.

With the aforementioned optimization method, a shift sequence of a change of transmission ratio in a transmission device is able to be determined online in current operations of a vehicle, since only low computing power and low computing times are necessary for carrying out the optimization routine.

If the calculation of the optimization problem, and thus the determination of the shift sequence of a change of transmission ratio of a transmission device, is carried out offline, heuristic methods, such as simulated annealing, stochastic search methods, genetic methods, evolutionary algorithms or deterministic approaches, such as screening or subdivision techniques, can also be used.

If the shift sequence is divided into various shift sequence stages, whereas each individual shift sequence stage represents at least one transition stage, during which the shifting element to be switched off for carrying out the requested change of transmission ratio is transferred from a closed operating state in a slip operation, or the shifting element to be switched on for carrying out the requested change of transmission ratio is transferred into a closed operating state in a slip operation, under adherence to a constant characteristic of rotation speed acceleration, and at least one gliding stage, during which a differential rotation speed in the area of the shifting element to be switched on for carrying out the requested change of transmission ratio is reduced, the stage times of the shift sequence stages, preferably the gliding stage, are variable through the optimization routine.

If the shift sequence is determined through the optimization routine sequentially for each shift sequence stage, the optimization routine is feasible with only linear optimization methods requiring minimal computer performance.

If, by contrast to this, the shift sequence is determined through the optimization routine, while taking into account all stages of the shift sequence globally throughout all stages, the optimization routine is preferably implemented by means of a method of limited optimization that is not linear, which requires higher computer performance compared to linear optimization methods, but compared to the solutions known from the state of the art, delivers better results within shorter computer times in conjunction with the approach under the invention.

With another advantageous variant of the method under the invention, the model represented by the vehicle drive train takes into account all mass inertias of the vehicle drive train, preferably the mass inertia of a vehicle structure of the vehicle constructed with the vehicle drive train, and also the drive inertia and inertia of the intermediate shaft, and at least changes by the transmission device along with the angular accelerations of the shafts of the vehicle drive train, in particular of the shafts of the transmission device, along with the torque taking effect in the vehicle drive train. This is done in order to be able to depict the actual vehicle system with a high degree of accuracy and be able to determine a shift sequence of a change of transmission ratio in a transmission device of a vehicle drive train to achieve driving behavior of a vehicle that can be understood by the driver, with as little effort as possible, and with the accuracy necessary for this purpose.

If several target values are supplied in the form of a functional connection to be minimized or maximized, and limits of the operating state quantities are supplied in the form of inequalities of the optimization routine, the solution of the optimization problem is feasible with the assistance of known methods, with little effort and within short computing times.

With another advantageous variant of the method under the invention, the optimization routine supplies several target values as input quantities, and the shift sequence is generated depending on a multiple target optimization, whereas a specific compromise is adjustable between the target values. Thus, an application of a shifting is feasible largely independent of the specific situation, since the same set of parameters can be used for all, or many different, operating situations of a vehicle drive train.

Through the formulation of a limited multiple target optimization problem, which takes into account several competing target values and various boundary conditions and/or limits of the operating state quantities, a simple adjustment of a compromise between driver comfort, component loads and the particular shifting time is possible. In doing so, through the adjustment of boundary conditions, maximum or minimum values for certain parameters, such as the shifting times or coupler loads or comfort dimensions, just like the change of output acceleration, are able to be maintained. In addition, physical limits regarding inequality conditions are able to be taken into account, by which, for example, the specification of positive control pressures for the operation of the shifting elements involved in the changes of transmission ratios is ensured. This automatically gives rise to one of the shifting elements, that is, the shifting element to be opened or closed, is actively involved in a shifting and/or in the change of transmission ratio.

If the shift sequence is determined depending on a component load, and preferably additional targets during the change of transmission ratio, preferably depending on a load of the shifting elements involved in the change of transmission ratio, the shift sequence is able to be determined, for example, by moving the compromise between the component load and the additional targets, such that, in the area of the shifting elements, the component load is as low as possible, and the shifting elements feature a long service life.

With additional advantageous variants of the method under the invention, the shift sequence is determined depending on a defined interval of shifting time, within which the change of transmission ratio is to be carried out, and/or depending on a defined maximum permissible change of a torque taking effect in the area of the output drive, by which the determination of the shift sequence is able to be changed in terms of application without any change to the approach under the invention.

If the shift sequence is determined depending on defined maximum permissible torque values of the vehicle drive train, preferably on the torque values taking effect on the shifting elements involved in the change of transmission ratio, overloads in the area of the vehicle drive train are avoided in a simple manner through the determined shift sequence.

A requested shifting with a high degree of shifting comfort is feasible if the shift sequence is determined depending on a defined maximum permissible change of a torque taking effect on the output drive and/or depending on the defined maximum permissible rotation speeds and/or gradients of rotation speed characteristics of the vehicle drive train, preferably on the rotation speeds and/or gradients of rotation speed characteristics of shafts of the transmission device. In this manner, it is also the case that excessive loads on the shifting elements, which can lead to permanent damages to the functioning of the shifting elements, are avoidable in a simple manner.

For some of the aforementioned aspects, a minimization is desirable, whereas, however, maximum permissible values, such as shifting times or component loads, are also able to be maintained. Therefore, the aspects are able to be taken into account as both target values to be minimized or maximized, and as boundary conditions in the form of maximum permissible limits for determining the shift sequence.

In addition, there is the possibility that the shift sequence is determined depending on comfort dimensions to be minimized or maximized during the change of transmission ratio, preferably depending on the change of vehicle acceleration and/or change of output acceleration that occurs within that change of transmission ratio.

Both the characteristics specified in the claims and the characteristics specified in the embodiments under the invention are, by themselves alone or in any combination with one another, suitable for providing additional embodiments under the invention. In terms of the additional embodiments, the particular combinations of characteristics do not represent a limitation; rather, they are essentially solely of an exemplary nature.

BRIEF DESCRIPTION OF THE DRAWINGS

Additional advantages and advantageous further forms of the invention arise from the claims and the embodiment, with reference to the drawing in terms of principle.

The following is shown.

DETAILED DESCRIPTION

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

Figure 1:
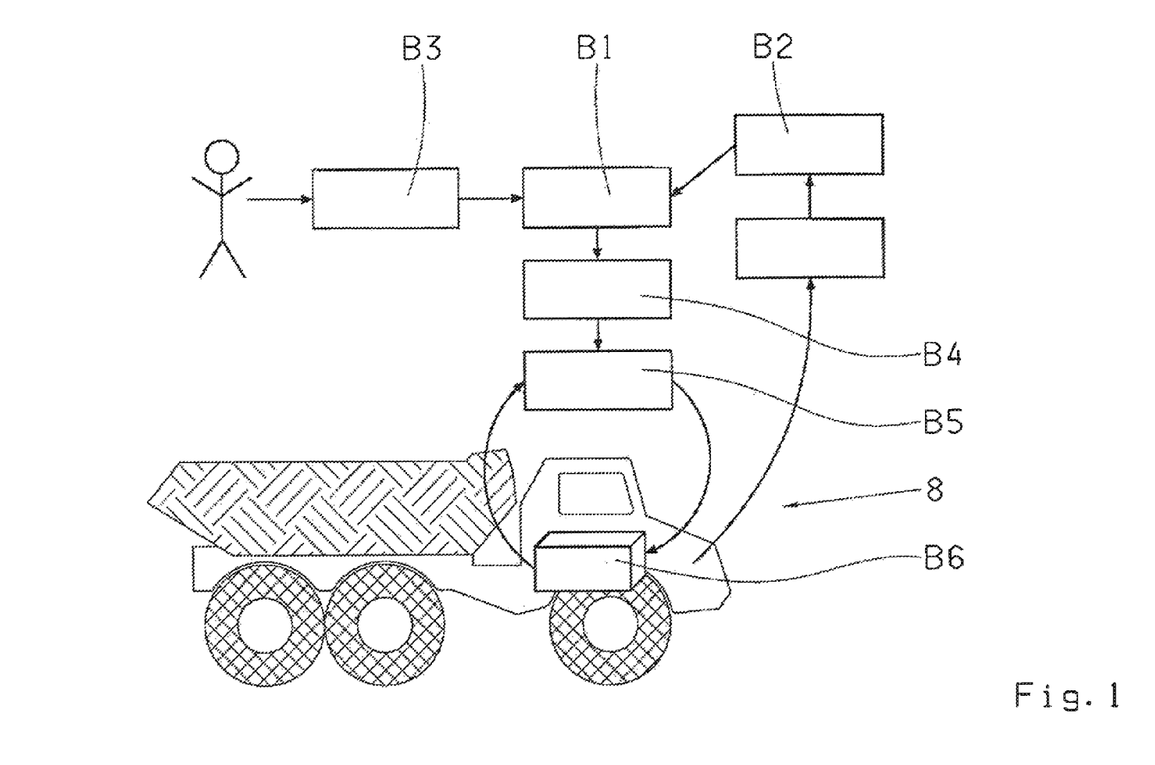
FIG. 1 is a highly simplified block diagram of a variant of the approach under the invention.
Figure 2:
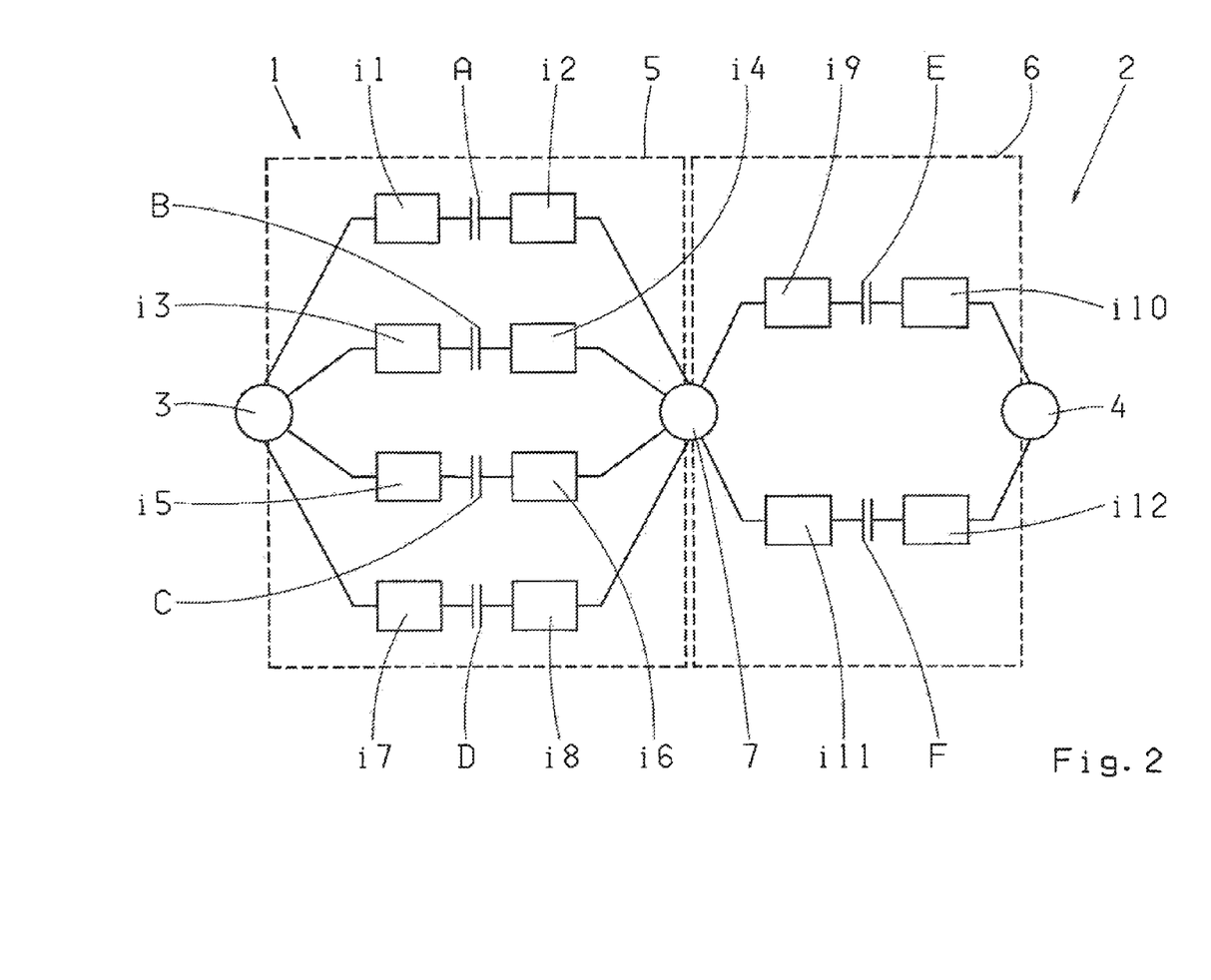
FIG. 2 is a simplified 3-dimension model of a vehicle drive train with a two-part transmission, through which the eight gears are able to be represented.

In FIG. 1, a highly schematized block diagram of a method for determining a shift sequence of a change of transmission ratio is shown, through which shift sequences of a transmission device 1 of a vehicle drive train 2, likewise represented in a highly simplified manner in FIG. 2, are able to be determined starting from an actual transmission ratio inserted in the transmission device 1 in the direction of a target transmission ratio to be inserted in the transmission device 1. A drive unit 3 is connected to the transmission device on the side of the input of the transmission and an output drive 4 is operatively connected to the transmission device 2 on the side of the output of the transmission.

In the present case, referring to FIG. 2, the method is described on the basis of the transmission device 1, which consists of two serially arranged transmissions 5, 6. In the present case, the transmission 5 represents a splitter, by which small transmission jumps are realized, while the transmission 6 represents a group or a main gearbox, by which large transmission jumps are realized. Using the combination of the two transmissions 5 and 6 in the present case, eight transmission ratios for forward travel are able to be realized, whereas both the splitter 5 and the group 6 are constructed as automatic powershift transmissions.

The change of transmission ratio is carried out either through simple power shifts, during which only one change of transmission ratio takes place by way of the splitter 5, or through so-called "group change power shifts," during which one change of transmission ratio takes place both by way of the splitter 5 and by way of the group 6. During group change power shifts, the two power shifts by way of the splitter 5 and the group 6 run simultaneously and are coordinated accordingly, in order to transfer the gear transmission ratio from a current actual transmission ratio inserted in the transmission device in the direction of a target transmission ratio to be inserted in the transmission device to a requested extent. Within the transmission device 1, during a group change power shift, a large transmission jump must be overcome, which gives rise to a large rotation speed change at the central shaft 7 connecting the splitter 5 and the group 6 with each other. If there are unfavorable operating state characteristics of the vehicle drive train 2, the large rotation speed change at the central shaft 7 may lead to a significant influence of a rotation speed at the output drive 4 and, as a result, to an increased component load and to losses of comfort.

With the method more specifically described below for determining a shift sequence of a change of transmission ratio in the transmission device 1, there is an option of, in a simple manner, carrying out the change of transmission ratio based on a predetermined shift sequence in such a manner that the component loads and losses of comfort resulting from the change of transmission ratio are as low as possible.

However, the method more specifically described below is also suitable for the purpose of determining shift sequences for a change of transmission ratio in any implemented transmission device, such as conventional automatic transmissions with intermediate gear designs or planetary gear designs, and being able to carry out the requested shifts in the desired extent by means of the determined shift sequences.

In order to carry out a change of transmission ratio in the transmission device 1, at least one shifting element A to D of the splitter 5 is to be switched off from the power flow of the vehicle drive train 2, and an additional shifting element A to D is to be switched on in the power flow of the vehicle drive train 2, if the requested change of transmission ratio is feasible through a simple power shift. However, if a group change power shift in the transmission device 1 is necessary to carry out the requested change of transmission ratio, in the splitter 5, one of the shifting elements A to D is to be switched off and an additional shifting element A to D is to be switched on, and at the same time, in the group 6, a shifting element E or F is to be switched off and the other shifting element F or E is to be switched on.

The representation shown in FIG. 2 is an exemplary illustration of the vehicle drive train 2 of a simple formalized drive train model, which describes inertias, transmission ratio relationships i1 to i12 and physical boundary conditions, in order to thus ensure adherence with the physical laws. The physical boundary conditions are supplied, in addition to the target values that determine the shift sequence in terms of characterization and application, in the form of a functional connection as input quantities of an optimization routine B1 (FIG. 1). Moreover, in addition to the time-invariant quantities independent of the specific situation, i.e. the inertias of the drive unit 3, various shafts of the vehicle drive train 1 and of a vehicle structure of a vehicle 8 constructed with vehicle drive train 2, time-varying quantities dependent on the specific situation, such as angular accelerations of the shafts of the vehicle drive train 2 along with controlling torques and resisting torques, are also supplied by a model B2 representing the vehicle drive train 2. The output quantities issued by model B2 and presenting input quantities of the optimization routine B1 are determined depending on an operating state of the vehicle drive train 2 existing upon the actual transmission ratio inserted in the transmission device 1.

By way of the optimization routine B1, depending on the output quantities of the model B2 and the target values and boundary conditions, and/or the limits of the operating state quantities of the vehicle drive train 2, as provided by a function block B3, a shift sequence for a requested shifting is determined. From the shift sequence calculated by the optimization routine B1, optimal movements of the shafts of the vehicle drive train 2 and the torque characteristics of devices of the vehicle drive train 2 necessary for the transmission change, by which, during each change of transmission ratio in the transmission device 1, a torque is introduced in the vehicle drive train 2 and/or a torque leading into the vehicle drive train is changed.

Thereby, in the present case, the drive unit 3 corresponds to a device of the vehicle drive train 2, by which, during the change of transmission ratio, a torque in the form of a drive torque is introduced during a traction operation of the vehicle drive train 2, or a braking torque and/or a push torque is introduced during an overrun operation of the vehicle drive train 2. The shifting elements A to F, which can be implemented as frictional clutches, brakes, or even synchronizations, in turn correspond with devices of the vehicle drive train 2, by which, during each change of transmission ratio, a torque leading into the vehicle drive train is changed, if they are involved in the particular change of transmission ratio to be carried out.

Depending on the respective application in the present case, a vehicle drive train may also feature additional devices, such as a hydrodynamic torque converter, a retarder, brakes, motors or generators and the like, which then likewise represent torque-generating or torque-changing devices of a vehicle drive train and which are taken into account during the determination of the shift sequence depending on the existing operating state of the vehicle drive train upon the actual transmission ratio inserted, and the conduct of which, during the carrying out of the requested change of transmission ratio, is able to be changed by the shift sequence to the desired extent for the implementation of the target values and boundary conditions by means of a corresponding control and/or adjustment.

During the carrying out of this method, which uses the simple vehicle drive train model B2 in order to pre-calculate an optimal movement, i.e. optimal rotation speeds and angular accelerations of the shafts of the vehicle drive train involved in the change of transmission ratio, the rotation speed characteristics and torque characteristics are pre-calculated, which represent the shift sequence. The rotation speed characteristics and torque characteristics are issued to a function block B4 and are connected through a control-oriented approach to the existing devices of the vehicle drive train 2, i.e. the drive unit 3 and the shifting elements A to F, in order to implement the requested change of transmission ratio depending on the determined shift sequence. For this purpose, all actuators existing in a vehicle drive train, such as clutches, engines or generators, a converter, a retarder, brakes and the like are correspondingly activated for the optimized shift sequence.

In the present case, the shift sequence is divided into various shift sequence stages, although this is not absolutely necessary. Each of the individual shift sequence stages represents at least one transition stage, during which the shifting element A to D or E and/or F to be switched off for carrying out the requested change of transmission ratio is transferred from a closed operating state in a slip operation, or the shifting element A to D or E and/or F to be switched off for carrying out the requested change of transmission ratio is transferred from a closed operating state into a slip operation, under adherence to a constant characteristic of rotation speed acceleration, and at least one gliding stage, during which a differential rotation speed of the shifting element A to D or E and/or F to be switched on for carrying out the requested change of transmission ratio is reduced.

The determination of the shift sequence and/or the optimization in the area of the optimization routine B1 is effected on the basis of the reduced model B2, which exists in the form of a system of equations. The target movement characteristics determined through this method and/or the required drive torques of the devices of the vehicle drive train 2 arise from the driving situation and the definition of the target values and/or the shifting targets. On the basis of such shifting targets prescribed in terms of application, such as, for example, a low load of the switches A to F involved in the change of transmission ratio, no change, or only a slight change, of a rotation speed at the output drive 4 or a brief shifting time are, regarding such shifting targets formulated in such a way of optimal characteristics of the torques of the devices of the vehicle drive train 2 and the resulting rotation speeds of the shafts of the vehicle drive train affected by the requested change of transmission ratio, calculated with the assistance of a numerical optimization method, and then transmitted into a transmission scheme provided in the area of the function block B6. For the determination of the shift sequence, equations of motion are indicated with the angular acceleration $\dot{\omega}$ of the shafts and each engaging torque M, as a linear system of equations of the form $$\Theta \cdot \dot{\omega} = K \cdot M$$

The mass matrix $\Theta$ contains the inertia torques of the shafts; the matrix K contains the transmission ratio relationships between the actuators and the shafts. Differential accelerations in the area of the shifting elements A to F are determined through the relationship $$\Delta\dot{\omega} = D \cdot \dot{\omega}$$

This model allows for an explicit solution of the equation of motion that is defined in sections, by which iterative integration methods can be avoided.

A closed clutch (i) is able to be represented through an ancillary equality constraint set forth below, which represents an obligatory constraint.

$$\Delta\dot{\omega}_i = D_i \cdot \dot{\omega} = 0$$

Thereby, the resulting torque $M_i$ may take positive and negative values.

The physical boundary conditions are prescribed through auxiliary inequality constraints. A physical boundary condition represents the limit of each torque provided from the drive unit 3, which is prescribed less than or equal to a maximum torque value and greater than or equal to a minimum torque value. In addition, the control pressures to be adjusted in the area of the shifting elements A to F during the shift sequence are defined as positive.

The optimization problem is formulated as a linear optimization problem, whereas two gliding stages are taken into consideration in the current approach, which underlies a group change power shift in the transmission device 1. During the first gliding stage, the rotation speed difference of the shifting elements A to D to be closed is completely released. In the second gliding stage, the rotation speed difference of the shifting element E or F of group 6 to be closed is reduced. In the first gliding stage in the present case, a transition stage is chronologically shifted ahead, during which the shifting elements A to D and E or F to be opened are transferred in a slip operation. Between the two gliding stages, a further transition stage is intended, during which the shifting elements A to D to be closed in the area of the splitter 5 is closed smoothly, i.e. with a constant characteristic of rotation speed accelerations. The second gliding stage is followed by a further transition stage as a fifth shift sequence stage, during which the shifting element E or F to be closed in the area of the group 6 is closed smoothly.

Generally, a linear optimization problem takes the form of a scalar product of a transposed matrix $c^T$ and a vector x:

$$\min c^T \cdot x$$

taking into account the auxiliary constraints $A_{eq} \cdot x = b_{eq}$ and $A_k \cdot x \le b_{tc}$ In the present problem, the controlling torques of the devices of the vehicle drive train 2 and the angular accelerations of the shafts of the vehicle drive train 2 affected by the requested change of transmission ratio form the vector x of the optimization parameters:

$$x = \begin{bmatrix} \dot{\omega} \\ M_{Stell} \end{bmatrix}$$

The equation of motion and any existing obligatory constraints are directly incorporated into the auxiliary equality constraints, for example, with the following obligatory constraint:

$$x = \begin{bmatrix} \Theta & -K_{Stell} \\ D_i & 0 \end{bmatrix},$$

$$b_{eq} = \begin{bmatrix} K_{ext} \cdot M_{ext} \\ 0 \end{bmatrix}$$

In addition to the optimization problem, the optimization method simultaneously solves the equation of motion, by which the special structure of the model representing the vehicle drive train 2 is used during optimization. Through the auxiliary inequality constraints, physical boundary conditions and functional aspects can be taken into account.

The determination of the shift sequence is formulated as a multiple target optimization problem. Thereby, the different target values and/or shifting targets are able to be weighted, prioritized and/or balanced among each other through parameters. The application is effected through these target weightings and hard boundary conditions, by which the concept of an applicator is transferable into the optimization problem through an optimal shift sequence. Instead of prescribing pressure or torque characteristics, with the present method, target values and boundary conditions are defined, by which there is an inversion of the problem of design. The target values and boundary conditions are largely independent of the various driving situations. This results in a small number of application parameters, which greatly simplifies and accelerates the design.

In the present case, the multiple target optimization problem is formulated as a so-called min-max problem:

$$\min_x \left\{ \max_j \frac{g_j^T \cdot x - p_j}{w_j} \right\}$$

This can be brought about through a set of transformations in the form shown above. Several target criteria and/or target values $g_j^T \cdot x$ may be considered. Through the target point $p_j$ and the weighting $w_j$, the various criteria may be compared with each other. The task of the min-max optimization is to minimize the criteria or target values that are worst fulfilled, as the case may be. In addition to the boundary conditions, the quantities $p_j$ and $w_j$ serve the purpose of the application of the method.

In general, by means of the method under the invention regarding generated target values, the desired movements of the shafts of the transmission device 1 and the vehicle drive train 2 are able to be described on the basis of the rotation speed and angular acceleration characteristic of the individual shafts. The target values are able to be calculated on the basis of a mechanical rigid body model. The rigid body model then describes the dynamics of the vehicle drive train 2, consisting of the drive unit 3, the transmission device 1 and the output drive 4, including the vehicle mass. Thereby, a converter clutch of the vehicle drive train 2, not more specifically represented in the drawing, is acceptable when closed, which is why the drive unit 3 and the transmission input of the transmission device 1 can be considered collectively as one rigid mass.

Existing degrees of freedom in the movement of the shafts from the actual transmission ratio in the direction of the target transmission ratio are able to be used with the assistance of mathematical optimization methods, in order to be able to calculate the optimal target value characteristics. Such degrees of freedom are the variably adjustable closing times of the splitter 5 and the group 6, along with the tolerated change of an acceleration of output drive 4. Methods of linear optimization, such as simplex methods or interior points methods for linear problems, or methods of limited, non-linear optimization, such as methods of quadratic optimization, SQP methods or interior points methods for non-linear problems can be used as optimization methods. With an offline calculation of the optimization problem, and/or with an offline determination of the shift sequence of a change of transmission ratio in the transmission device 1, heuristic methods, such as simulated annealing, stochastic search methods, genetic methods, evolutionary algorithms or deterministic approaches, such as screening or subdivision techniques, can also be used.

In the calculation of the target values, an influence of additional torque controls and/or devices of the vehicle drive train, such as the drive unit 3 or an additionally provided retarder, may be taken into account. Thereby, the control of drive unit 3 can be realized both through torque specifications and through rotation speed specifications, since both quantities are included in the calculation.

If the determination of the shift sequence and the optimization provided for this purpose are effected in real time on a control unit for controlling the transmission device 1, locally convergent optimization methods are preferred. An application of power shifts is effected through the weighting of target values and the specification of boundary conditions. In doing so, target values, such as changes in the area of the output drive 4, component loads, shifting times and additional physical or technical boundary conditions, can be taken into account.

Generally, various targets and requirements for the method are provided. So, for example, impermissible limitations upon calculating the slip torques to be adjusted in the area of the shifting elements A to F, involved in carrying out the requested change of transmission ratio, are to be avoided. Furthermore, determining the shift sequence in the real-time area of a control unit or an offline calculation on an application PC is to be possible. Furthermore, the application of the shifting should be realized as simply as possible. Ideally, the method is adjusted with only a few parameters, independent of the specific situation. In addition, an improvement of the shifting can be effected through an influence of the torque of the drive unit 3.

Based on the linking of the abstract, formal model B2 with rapid, locally convergent optimization methods, a version of the method on a control unit in real time is possible. If the shift sequence is carried out offline on an application laptop for the rapid calculation of tables, coordination directly on the vehicle is possible.

The presented method is based on a model-based approach, with a generally applicable method for calculating target value characteristics. Thereby, the method is applicable for simple power shifts, for group change power shifts or even for more complex transmission types consisting of three or more transmission components, whereas, depending on the type of shifting or transmission, several transition and gliding stages or only one transition and gliding stage must be taken into account. The use of the method requires no specific structural modifications whatsoever of an already existing transmission system, as it is individually adapted to each considered transmission system and the structure of a vehicle drive train with little effort.

Furthermore, the method works with variable shifting times, by which a natural movement of the system is optimally usable, and no unnatural movement is imposed on the system. During certain shifts, in particular during traction upshifts or push downshifts, the central shaft 7 moves solely based on the maintaining of the traction or push torque at the output drive 4, through a corresponding pressing of a clutch E or F or group 6, already in the desired direction. As such, a change of transmission ratio of the splitter 5 is feasible without any intervention of the splitter 5, whereas the shifting time of the change of transmission ratio in the area of the splitter 5 thereby arises from the particular operational situation.

If the method in the described manner is carried out on the basis of a multiple target optimization, through which the various and often conflicting targets are balanced against each other, for example a compromise consisting of a change in output, component loads and maximum shifting times arising during the change of transmission ratio are able to be represented. The combination of the various targets into a target functional can be effected with the assistance of different methods. What is preferred here is the goal attainment method, which is synonymous with the formulation as a min-max problem.

The application of the shifting is undertaken through a weighting of the various target values. The actual drive quantities are determined on the basis of these target values. The adjustment parameters for the application are essentially the weightings of the individual target values. Therefore, relatively few adjustment parameters arise. With the method known from the state of the art, control quantities that are directly dependent on the situation are parameterized, in order to achieve certain targets. This requires a significantly higher number of parameters, thereby significantly hampering the determination of the shift sequences.

Thereby, the optimization can be effected individually for the different shift sequence stages, or can be carried out globally throughout all shift sequence stages. Thereby, the stage times of the shift sequence stages, specifically the gliding stages, can be varied through the optimization.

Modifications and variations can be made to the embodiments illustrated or described herein without departing from the scope and spirit of the invention as set forth in the appended claims.

The invention claimed is:

1. A method for determining a shift sequence for a transmission ratio change in a vehicle drive train from an actual transmission ratio to a target transmission ratio, wherein the vehicle drive train includes a transmission device, a drive unit connected to an input side of the transmission device and an output drive connected to an output side of the transmission device, wherein the transmission ratio change includes switching off at least one shifting element and switching on at least one different shifting element in the transmission device, and wherein during the transmission ratio change a torque leading into or introduced in the vehicle drive train is changed, the method comprising:

determining operating state quantities of the vehicle drive train at the actual transmission ratio, the operating state quantities corresponding to inputs for a computer-implemented model of the vehicle drive train;

inputting the operating state quantities into the computer-implemented model of the vehicle drive train;

with the computer-implemented model of the vehicle drive train, generating at least one output target value based upon the operating state quantities, the at least one output target value comprising both limits of the operating state quantities and a functional relationship between the operating state quantities;

inputting the at least one output target value into an optimization routine;

with the optimization routine, generating a shift sequence of the shifting elements based on a minimization of the functional relationship between the operating state quantities and also based on the limits of the operating state quantities, wherein the shift sequence provides torque characteristics for drive train components necessary for the transmission ratio change and generation of the torque leading into or introduced in the vehicle drive train for the transmission ratio change; and implementing the shift sequence in the transmission device.

2. The method as in claim 1, wherein the at least one output target value is determined iteratively with the computer implemented model.

3. The method as in claim 1, wherein the optimization routine comprises a locally convergent optimization.

4. The method as in claim 3, wherein the optimization routine comprises a derivative or linear locally convergent optimization.

5. The method as in claim 1, wherein the shift sequence is divided into shift sequence stages, with each shift sequence stage including a transition stage wherein the shifting element to be switched off for the carrying out the transmission ratio change is transferred out of a closed operating state in a slip operation, and the shifting element to be switched on for the carrying out the transmission ratio change is transferred into a closed operating state in a slip operation, each shift sequence stage also including a gliding stage in which a differential rotational speed of the shifting element to be switched on is reduced.

6. The method as in claim 5, wherein the shift sequence is determined in the optimization routine sequentially for each shift sequence stage.

7. The method as in claim 5, wherein the shift sequence is determined in the optimization routine with simultaneous consideration of all shift sequence stages for the shift sequence.

8. The method as in claim 1, wherein the operating state quantities comprise mass inertia of a vehicle structure constructed with the vehicle drive train, drive inertia, inertia of an intermediate shaft of the transmission device, transmission ratios of the transmission device, angular accelerations of shafts of the transmission device and torque in the vehicle drive train.

9. The method as in claim 1, wherein the at least one output target value comprises multiple target values, each target value of the multiple target values comprising a functional relationship between the operating state parameters entered into the optimization routine in order to be minimized or maximized with the optimization routine, each target value of the multiple target values also comprising limits of the operating state quantities entered as inequalities in the optimization routine.

10. The method as in claim 9, wherein the shift sequence is generated by optimization of the multiple target values with an adjustable compromise between the multiple target values.

11. The method as in claim 9, wherein the shift sequence is determined as a function of loads on the shifting elements involved in the transmission ratio change.

12. The method as in claim 9, wherein the shift sequence is determined as a function of a defined interval of shifting time in which the transmission ratio change is to be carried out.

13. The method as in claim 9, wherein the shift sequence is determined as a function of a defined maximum change of torque on the vehicle drive unit for the transmission ratio change.

14. The method as in claim 9, wherein the shift sequence is determined as a function of defined maximum torque values on the shifting elements involved in the transmission ratio change.

15. The method as in claim 9, wherein the shift sequence is determined as a function of defined maximum rotation speeds or gradients of rotation speed characteristics of shafts in the transmission device.

* * * * *